Feb. 19, 1957  S. K. MOXNESS  2,781,547
MOLDING PROCEDURE AND APPARATUS
Filed Dec. 26, 1951
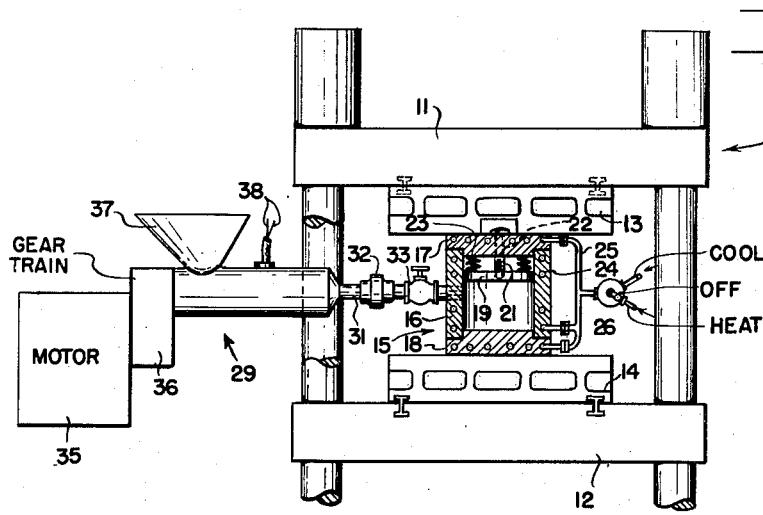
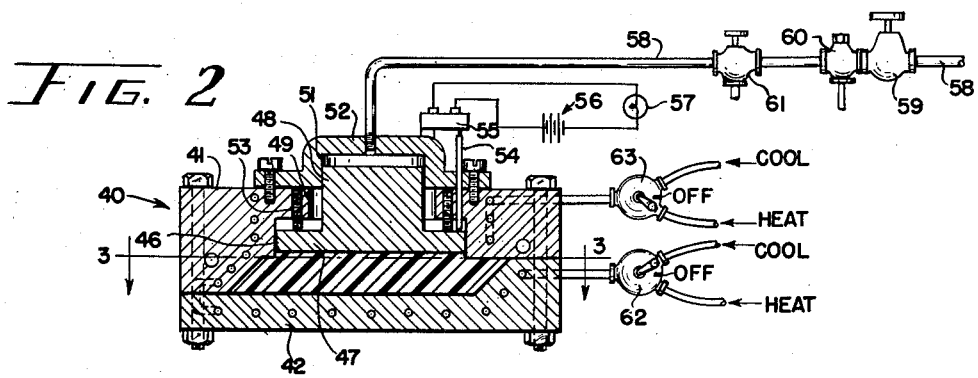
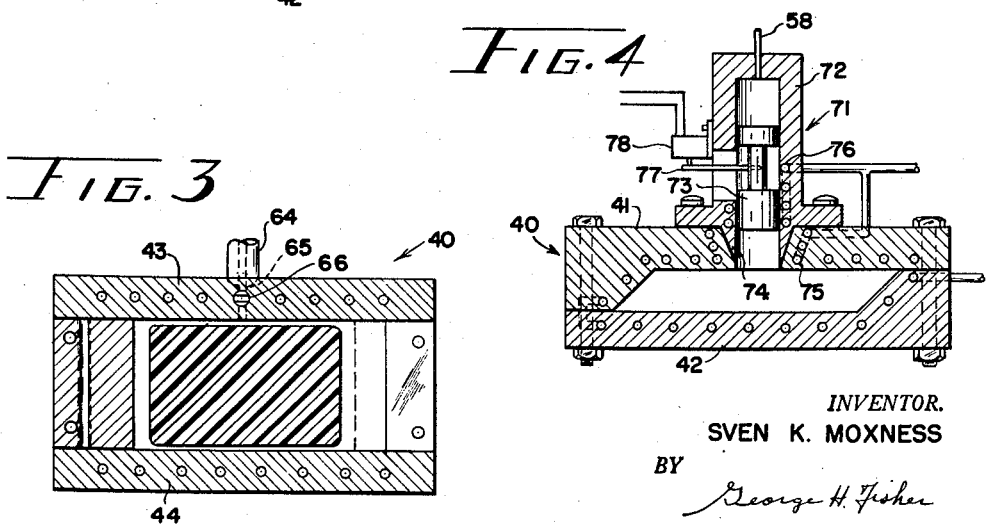
INVENTOR.
SVEN K. MOXNESS
BY
George H. Fisher
ATTORNEY

United States Patent Office 2,781,547
Patented Feb. 19, 1957

2,781,547

MOLDING PROCEDURE AND APPARATUS

Sven K. Moxness, Racine, Wis., assignor to Minneapolis-Honeywell Regulator Company, Minneapolis, Minn., a corporation of Delaware Application December 26, 1951, Serial No. 263,320

14 Claims. (Cl. 18—30)

This invention relates to improvements in the art of plastic molding.

In molding thermo-plastic material, chilled molds are conventionally used to prevent shrinkage and to speed up the setting of the material. However, because the chilled molds tend to cause rapid setting, very high pressures, such as 20,000 pounds per square inch, are used which necessitate heavy and costly equipment. Further, the compressing of partly solidified molding material causes serious defects from an optical point of view, due to stress concentrations. To overcome these difficulties, the molding pressure is, by the present process, greatly reduced by heating the molds prior to molding rather than chilling them, thus permitting the use of lighter and less costly equipment. The expected shrinkage is then obviated by providing an auxiliary injection of material during the shrinkage period, the auxiliary injection apparatus being kept warm enough for proper injection.

Because the plastic material remains fluid in the heated mold during its filling, only sufficient pressure need be used to insure such filling and, beause there is a minimum of forcing of partially solidified material, the optical quality of clear molded objects is considerably improved and is adequate for most purposes. Further, characteristics of the process which result in improved optical qualities also give improved plastic articles of general utility.

It is thus an object of this invention to provide apparatus and procedures for plastic molding including one or more of the novel features and advantages outlined above. Also, a study of the following specification and drawings should reveal other and additional advantages.

Figure 1 is an elevation view, with parts in section and parts broken away, of one form of the apparatus used.

Figure 2 shows a sectional elevation of another form of mold and schematically shows a different source of pressure for auxiliary injection.

Figure 3 is a sectional view taken from the line 3—3 of Figure 2.

Figure 4 is a sectional elevation of a modified mold of the general sort shown in Figure 2.

In Figure 1, the numeral 10 designates a conventional molding press having relatively movable platens 11 and 12 with base members 13 and 14 attached thereto. Mold 15, located between these base members and held together by the press 10, comprises a central cylindrical portion 16, end plugs 17 and 18, and a movable piston-like wall 19. Wall 19 is limited in its movements by a cap screw 21 guided by a suitable hole 22 in member 17 and the member 19 is urged downwardly by springs 23, the springs 23 being of sufficient number and strength to develop the desired unit pressures in the mold. The upward travel of wall 19 is limited by the collapsed dimensions of the springs used or by any other suitable stop means.

Mold members 16, 17 and 18 are cored to provide passages such as 24 for heating or cooling fluid, the fluid being supplied through conduits 25 under control of a diverting valve 26. Return conduits, not shown, are normally used but omitted here for convenience.

Molten thermoplastic material is supplied to mold 15 from extruder 29 through a suitable conduit 31 including a detachable connection 32 and a shut-off valve 33. Extruder 29, which may be of any suitable sort, is driven by a motor 35 through a gear train 36, the motor being controlled by a switch, not shown. A suitable thermoplastic material is fed into the extruder through a hopper 37 and is heated by a concealed electric heater energized by conductors 38. In this illustration, the position of member 19 is determined by observing the position of the head of cap screw 21 but, obviously, this is only illustrative and any other position indicating or responsive means may be used.

To place the above apparatus in operation, the mold 15 is assembled between the base members 13 and 14 of the press and the press is operated to apply pressure to these members to thereby hold the mold together. With conduits 25 connected to the mold and to valve 26, and valve 26 also being connected to a source of cool fluid and to a source of heating fluid, as indicated in Figure 1, the valve is adjusted to provide heat, as shown and the mold is heated to a predetermined temperature such as 300–400° F. or more. The temperature depends upon the type of material being used, the size and intricacy of the mold and other such factors. Upon the mold becoming heated, extruder 29 is operated by feeding plastic material to the hopper and heating this material by the concealed heater. The extruder 29 is operated to inject molten thermo-plastic material into mold 15 until wall 19 is forced upwardly a predetermined distance, this being detected in the present illustration by observing the position of the head of cap screw 21. As before mentioned, the pressure exerted by the fluid in the mold must be sufficient to overcome springs 23 and, for the purpose of this illustration, may be assumed to be about 100 pounds per square inch, although pressures from 50 to 1000 pounds per square inch have been used successfully and even lower pressures seem feasible. Upon mold 15 being filled with thermo-plastic material, as indicated by an elevated position of the head of screw 21, valve 33 is closed and extruder 29 is simultaneously stopped. Then, valve 26 is adjusted to direct cooling fluid to the mold 15 to thereby increase the speed of setting of the injected material. As the molding material cools and shrinks, wall 19 is forced downwardly by the pressure of springs 23 and maintains the mass homogeneous and keeps the surfaces true. Obviously, screw 21 must be so adjusted that it cannot function as a limiting stop during cooling and thereby take the load off the molded object. Upon sufficient setting of the material, determined principally by experience, the force exerted by the press 10 is relaxed and the mold 15 is disassembled sufficiently to remove the plastic object. Thereafter, the mold is reassembled and the procedure above outlined is repeated.

While the above illustration involves the molding of only a simple cylinder, Figure 2 shows an arrangement for molding the plastic body of a periscope. In this example, while the shape involved is relatively simple, considerable mass is required and very high optical quality is necessary. As shown in Figures 2 and 3, mold 40 comprises a top portion 41, a bottom portion 42, and side members 43 and 44. These parts are, for this example, held together by bolts although in commercial practice they will normally be held together by a press, as suggested in Figure 1. Also, as above, these members are cored for a circulation of heating and cooling fluid, with the heating and cooling passages for the upper portion of the mold being separate from those surrounding the body of the periscope or the mold cavity. As is apparent in the figures, the mold cavity is principally formed by the lower portion of the mold and the side plates. The upper portion of the mold includes a substantially rectangular cylinder-like portion 46 in which fits a sliding head 47 of a piston 48. The major portion of piston 48, preferably cylindrical, passes through a suitable opening 49 in mold member 41 and coacts with a cylindrical bore 51 of a cap member 52 attached to member 41 by suitable cap screws or the like. The upward travel of piston 48 is limited by stop screws 53 coacting with the head 47 of the piston and the push rod 54 also coacts with head 47 to actuate a snap switch 55 in a manner to complete a signal circuit including battery 56 and light 57 when the head 47 has reached its uppermost position. To force piston 48 downwardly, hydraulic pressure is supplied through conduit 58, pressure regulating valve 59, pressure relief valve 60, and a stop and waste valve 61 to the chamber between cap 52 and the head of piston 48. Suitable stop means, not shown, may be used to limit the downward movement of piston 48 during removal of the molded object and prior to filling of the mold.

As before mentioned, the heating and cooling passages for the body portion of the mold, or the principal cavity, are separate from those in the upper portion or auxiliary injection portion of the mold, with valve 62 controlling the flow of fluid to the cavity portion of the mold and valve 63 controlling the fluid for heating or cooling the auxiliary injection portion of the mold. With mold 40 assembled as shown, suitable injection material, such as DuPont Lucite, a methyl methacrylate, may be injected through injection nozzle 64 removably fitting in a mating socket 65 in member 43 of the mold, with the material being injected through a plug valve 66 built into member 43, the injection of material filling the mold cavity, the entire upper and lower portions of the mold being heated prior to injection, as above, and, upon the material filling the mold, piston 48 is forced upwardly against the pressure exerted by the hydraulic pressure means, this pressure being regulated by regulators 59 and 60. When piston 48 reaches its uppermost position, as limited by screws 53 and as determined by the energizing of signal 57, the further injection of material is stopped and valve 66 is turned to an off position. Thence, valve 62 is turned to a cool position, as shown, and valve 63 remains in a heat position as shown for a predetermined time. This upper portion is kept hot until the body of the mold has completed most of its shrinking, the piston 48, due to the pressure exerted against it, continually forcing material down into the body of the mold sufficient to take care of all of the shrinkage and to maintain the material forced tightly against the mold surfaces. Under normal operating procedures, the travel of piston 48 is sufficient to allow the injection of enough extra material to displace piston 48 by an amount to accommodate all the shrinkage that will take place as piston 48 forces this extra material back into the mold cavity. When the body of the molded article has cooled and the shrinkage period is substantially terminated, the upper portion of the mold is also cooled and, upon the setting of the article becoming complete, the mold is disassembled, the article removed and the next cycle of operation is undertaken.

In this example, it is noted that the area of piston head 47 is somewhat less than the wall of the body being molded and the edges of the auxiliary injection portion are spaced inwardly to some extent from the side walls of the molded object. This is done because it appears that the plastic material in contact with the walls of the mold is first to cool and, as the auxiliary injection tends to cause more movement of the plastic material nearest the piston, there is some tendency toward distortion and stress concentration unless the piston acts principally upon an area spaced from the side walls, as shown.

Figure 4 shows another version of a mold for making periscope bodies comprising upper and lower portions 41 and 42 similar to those previously described but having an auxiliary injection apparatus 71 comprising a cylinder 72 and a piston 73 movable therein. The lower end 74 of cylinder 72 is closely fitted to mold member 41 and extends to the chamber of the mold as a matter of convenience. Mold members 41 and 42 are cored for fluid passages as in the previous examples with separate passages 75 being formed adjacent the lower end of the cylinder 74 and with passages 76 being formed in the cylinder itself, passages 75 and 76 being connected together under the control of one valve and the remaining passages, around the mold cavity, being controlled by another valve, as in Figure 2. The travel of piston 73 is limited by suitable stops, not shown, and the upward movement of the piston is indicated by an arm 77 engaging the operating pin of a snap switch 78 connected in an indicating circuit, as in Figure 2. This mold is operated the same as in the previous examples, with the mold and cylinder first being heated to a predetermined temperature, such as 300 to 400° F. and then the molding material being forced into the mold until piston 73 is forced upwardly far enough to operate switch 78 and cause a resulting signal, piston 73 being forced upwardly against fluid pressure exerted through conduit 58. Upon the indication that the mold and the auxiliary injection apparatus are completely filled with molding material, the heat is cut off from the main mold portion and cooling liquid is circulated instead, heat continuing to be supplied to the auxiliary injection apparatus until the cooling has substantially set the main mass of molding material. When the main mass of material has set, with its shrinkage being prevented by the hydraulic pressure forcing piston 73 downwardly to replace the material being taken up by shrinkage, then the auxiliary apparatus is also cooled. When the molded object is completely set, the mold is disassembled, the object removed and the mold is then in a condition to repeat the process. As before, upon the filling of the mold and the auxiliary injection apparatus with molding material, the further injection of material is stopped and the passage for material into the mold is also closed, as by a valve such as 66, not shown in this figure.

It is to be kept in mind that the above disclosure is intended to be illustrative only and the various forms of the physical apparatus used, and the pressure and temperature values given, are only suggestive. Many alternatives of apparatus, procedure and materials will become apparent upon a study of this disclosure, hence the scope of this invention is to be determined only by the appended claims.

I claim as my invention:

1. In plastic molding of bodies of high optical quality, the procedure of heating a mold above the softening temperature of the material to be used, filling the mold cavity with said material in a softened state, continuing the filling procedure until the pressure in the mold cavity rises high enough to also force material from the mold cavity into a connected pressure chamber, the pressure chamber also being heated, continuing the filling of the mold cavity and pressure chamber until a predetermined amount of material has been forced into the pressure chamber, terminating the filing procedure, and cooling the mold and the pressure chamber, with the pressure chamber being cooled more slowly than the mold so that the molding material in the chamber tends to be more fluid than that in the mold cavity and is forced into the mold cavity by the chamber pressure as shrinkage takes place in the mold.

2. In plastic molding, the process comprising heating a mold, extruding plastic material into the mold sufficiently to fill the mold and under a pressure sufficient to force a predetermined amount of said material into a heated auxiliary injecting means connected to said mold and exerting a pressure less than said sufficient pressure, terminating the extruding of the plastic, cooling the mold, and then later cooling the auxiliary injecting means.

3. In plastic molding apparatus, a mold, means for injecting molding material into said mold under pressures rising above a predetermined value upon completion of the injection, auxiliary injecting apparatus capable of exerting a lesser unit pressure than said predetermined value during the filling of said mold, and heat cycling means arranged to cool said mold to a predetermined temperature in a certain period of time, and to cool said auxiliary injecting apparatus to said temperature in a period of time which is longer than said certain period, said auxiliary injecting apparatus communicating with said mold and arranged to be loaded by a portion of the material injected into the mold by said injecting means as the pressure of the material in said mold approaches said predetermined value, said auxiliary injecting apparatus being capable of injecting material into said mold when the material pressure in the mold is less than the pressure exerted by the auxiliary apparatus, the volume of molding material injected being substantially equal to the volume of shrinkage of the molding material in the mold when cooled from molding temperature to final setting temperature.

4. In plastic molding apparatus, a mold, means for heating and cooling said mold utilizing a first control means, means for injecting molding material into said mold under pressures rising to a predetermined value upon completion of the injection, auxiliary injecting apparatus normally exerting a lesser unit pressure than said predetermined value, said auxiliary injecting apparatus communicating with said mold and arranged to be loaded by a certain specific volume of the material which is injected into the mold by said injecting means when the pressure of the material of said mold approaches said predetermined value, and means for heating and cooling said auxiliary injecting apparatus utilizing a second control means, said auxiliary injecting apparatus being capable of injecting material into said mold when the material pressure in the mold is less than the pressure exerted by the auxiliary apparatus, the volume of molding material thus injected being at least equal to the volume of shrinkage of the molding material in the mold when cooled from its molding temperature to its final setting temperature.

5. Plastic molding apparatus comprising, a mold, means for heating and cooling said mold utilizing a first control means, main injecting means for injecting molding material into said mold, the pressure of the molding material in the mold rising to a predetermined value upon completion of the injection, auxiliary injecting means arranged to normally develop a lesser unit pressure than said predetermined value and communicating with said mold, said auxiliary apparatus being loaded with a volume of material which is at least equal to the loss in volume due to shrinkage of the material in the mold when cooled from molding temperature to setting temperature, said material being forced from said mold into said auxiliary apparatus as the pressure of material in said mold rises above the pressure normally exerted by the auxiliary means, means for heating and cooling the auxiliary means utilizing a second control means, and means independent of said main injecting means for terminating the injection of material by said main injecting means when the mold and said auxiliary means are properly filled.

6. In plastic molding apparatus, a mold, means for adjusting the heat of said mold controlled by a first control means, main injecting means for adjusting the heat of injecting molding material into said mold, said injecting means being capable of injecting material against pressures above a predetermined value, auxiliary injecting means comprising a cylinder and a piston, said cylinder communicating with said mold and being capable of receiving a certain specified volume of molding material under a continuous and controllable pressure from said mold while material is being injected by said main injecting means, said volume being at least equal to the volume of shrinkage of the material in the mold when cooled from molding temperature to setting temperature, means for adjusting the heat of said cylinder controlled by a second control means, means for exerting force against said piston sufficient to force molding material from said cylinder but insufficient to overcome pressures approximating said predetermined values, indicating means, and means responsive to a condition indicative of a proper filling of said mold and loading of said cylinder connected in controlling relation to said indicating means for terminating injection of molding material into said mold upon proper filling of said mold.

7. In plastic molding apparatus, a mold having a cavity surrounded by walls, one of said walls being movable, means for limiting the movement of said one wall, means for indicating movement of said one wall, means for exerting a predetermined force against said one wall in a direction urging it toward said cavity, means for injecting molding material into said cavity against the force of said exerting means, means for heating said mold above the softening point of said molding material, and means for cooling said mold, said cooling means being arranged to cool said movable wall after the remaining walls have been substantially cooled.

8. In plastic molding apparatus, a mold having a cavity surrounded by walls, one of said walls being movable and having pressure means for continuously urging said movable wall toward said cavity means for heating and cooling said mold, means for injecting hot molding material under the pressure exerted by said pressure means into said cavity, said pressure means arranged to maintain pressure on molding material forced into said cavity while said mold is being cooled, means for heating and cooling said pressure maintaining means, the heating and cooling means for said mold being constructed and arranged to cool said movable wall after the remaining walls have been substantially cooled.

9. In plastic molding apparatus, a mold, means for heating said mold, main injecting means for injecting molding material into said mold, said injecting means being capable of injecting material against pressures above a predetermined value, auxiliary injecting means comprising a cylinder and a piston, said cylinder communicating with said mold and being capable of receiving molding material from said mold while material is being injected by said main injecting means, means for exerting force against said piston sufficient to force molding material from said cylinder but insufficient to overcome pressures approximating said predetermined values, separately controlled cooling means for said mold and for said auxiliary injecting means, displacement responsive means arranged to be actuated by a predetermined movement of said piston due to material forced into said cylinder from said mold, and means including a switch operable by said displacement responsive means for controlling the amount of molding material injected into said mold and said auxiliary injecting means.

10. In plastic molding apparatus, a mold having a wall portion, means for heating said mold utilizing a first control means, main injecting means for injecting molding material into said mold, said injecting means being capable of injecting material against pressures above a predetermined value, auxiliary injecting means comprising a cylinder and a piston, said piston having a shape resembling said wall portion and said cylinder mating therewith, said cylinder communicating with said mold and being capable of receiving molding materials from said mold while material is being injected by said main injecting means, against the pressure of predetermined value exerted by said piston and toward said mold, the volume of molding material received by said cylinder being substantially equal to the volume of shrinkage of the molding material in said mold when cooled from molding temperature to final setting temperature, means for heating said cylinder utilizing a second control means, means for exerting force against said piston sufficient to force molding material from said cylinder but insufficient to overcome pressures approximating said predetermined values, means responsive to a predetermined displacement of said piston, and means including a switch operable by said displacement responsive means for controlling the amount of molding material injected into said mold and said auxiliary injecting means.

11. In plastic molding apparatus, a mold, means for heating said mold utilizing a first control means, main injecting means for injecting molding material into said mold, said injecting means being capable of injecting material against pressures above a predetermined value, auxiliary injecting means comprising a cylinder and a piston, said cylinder communicating with said mold and being capable of receiving a certain volume of molding material from said mold under pressure of said predetermined value while material is being injected by said main injecting means, said volume being equal to the volume of shrinkage of the molding material in the mold when cooled from molding temperature to setting temperature, means for heating said cylinder utilizing a second control means, means for exerting force against said piston sufficient to force molding material from said cylinder but insufficient to overcome pressure approximating said predetermined values, means responsive to a condition indicative of the proper filling of said mold and loading of said auxiliary injecting means, and means including a switch operable by said condition responsive means for controlling the amount of molding material injected into said mold and said auxiliary injecting means.

12. In plastic molding, the process comprising heating a mold, extruding plastic material into the mold sufficiently to fill the mold under a pressure sufficient to force a predetermined amount of said material into a heated auxiliary injecting means connected to said mold and exerting a pressure less than said sufficient pressure, terminating the extruding of the plastic, and then cooling the mold at a certain predetermined rate while cooling said auxiliary injecting means at a rate which is less than said predetermined rate.

13. In plastic molding apparatus, a mold, means for heating and cooling said mold utilizing a first control means, main injecting means for injecting molding material into said mold, said injecting means being capable of injecting material against pressure above a predetermined value, auxiliary injecting means comprising a cylinder and a piston, said cylinder communicating with said mold and being capable of receiving a certain volume of molding material from said mold while material is being injected by said main injecting means, said volume being equal to the volume of shrinkage of the molding material in the mold when cooled from molding temperature to setting temperature, means for heating and cooling said cylinder utilizing a second control means, means for exerting force against said piston sufficient to force molding material from said cylinder but insufficient to overcome pressures approximating said predetermined values, means responsive to a condition indicative of the proper filling of said mold and loading of said auxiliary injecting means, and switch means operable by said condition responsive means arranged to terminate injection of molding material into said mold upon proper filling of said mold and auxiliary means.

14. In plastic molding of bodies of high optical quality, the process comprising heating a mold, and an auxiliary injecting means filling said mold and auxiliary injecting means with plastic molding material against a continuous pressure exerted by said auxiliary injecting means, cooling said mold at a given rate, and following-up shrinkage of the molding material during cooling of the mold by continuously forcing a predetermined amount of relatively warmer molding material into said mold under a substantially constant pressure from said auxiliary injecting means during the cooling of the mold, and cooling said auxiliary injecting means at a rate less than said given rate.

References Cited in the file of this patent

UNITED STATES PATENTS

| | | |
|---|---|---|
| 1,606,705 | Joannides | Nov. 9, 1926 |
| 1,697,741 | Vaughan | Jan. 1, 1929 |
| 2,305,362 | Taylor | Dec. 15, 1942 |
| 2,355,613 | Wacker | Aug. 15, 1944 |
| 2,367,204 | Cousino | Jan. 16, 1945 |
| 2,443,826 | Johnson | June 22, 1948 |
| 2,470,402 | Jobst | May 17, 1949 |
| 2,473,588 | Johnson | June 21, 1949 |
| 2,578,719 | Mayer et al. | Dec. 18, 1951 |
| 2,666,230 | Sherman | Jan. 19, 1954 |
| 2,696,023 | Stott | Dec. 7, 1954 |

FOREIGN PATENTS

| | | |
|---|---|---|
| 388,662 | Great Britain | Mar. 2, 1933 |